(12) United States Patent
Chan

(10) Patent No.: US 12,541,235 B2
(45) Date of Patent: Feb. 3, 2026

(54) SYSTEMS AND METHODS WITH AUXILIARY CONTROL BOARDS HAVING INTERFACE DEVICES

(71) Applicant: Intel Corporation, Santa Clara, CA (US)

(72) Inventor: Allen Chan, Los Gatos, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 18/201,688

(22) Filed: May 24, 2023

(65) Prior Publication Data

US 2024/0393848 A1 Nov. 28, 2024

(51) Int. Cl.
*G06F 1/26* (2006.01)
*G06F 13/40* (2006.01)

(52) U.S. Cl.
CPC ............ *G06F 1/26* (2013.01); *G06F 13/4068* (2013.01)

(58) Field of Classification Search
CPC ................................ G06F 1/26; G06F 13/4068
See application file for complete search history.

(56) References Cited

U.S. PATENT DOCUMENTS

| | | | |
|---|---|---|---|
| 5,787,007 A * | 7/1998 | Bauer ..................... | G06F 30/34 703/23 |
| 6,715,019 B1 * | 3/2004 | Benson ............... | G06F 13/4081 710/305 |
| 7,248,070 B1 | 7/2007 | Guilloteau et al. | |
| 8,040,152 B1 * | 10/2011 | Han ..................... | H03K 19/177 326/38 |
| 8,856,600 B2 | 10/2014 | Zadigian et al. | |
| 10,649,944 B2 * | 5/2020 | Venkata .............. | G06F 13/4282 |
| 10,764,080 B2 * | 9/2020 | Ishizaka .................. | H04W 4/33 |
| 11,169,945 B1 * | 11/2021 | Wu ........................ | G06F 9/541 |
| 12,189,561 B2 * | 1/2025 | Cai ....................... | G06F 13/409 |
| 2005/0149624 A1 * | 7/2005 | Jakubiec ............... | H04L 12/403 710/305 |
| 2005/0182887 A1 * | 8/2005 | Sakurai ................. | G06F 13/385 710/315 |

(Continued)

FOREIGN PATENT DOCUMENTS

| | | | | |
|---|---|---|---|---|
| CN | 102184721 B | * | 1/2014 | |
| CN | 206946438 U | * | 1/2018 | |
| CN | 112231160 A | * | 1/2021 | .......... G06F 11/2236 |

OTHER PUBLICATIONS

Dewey-Hagborg, Heather, "Introduction to the Serial Peripheral Interface", Arduino.cc, Jan. 25, 2022 (Year: 2022).*

(Continued)

*Primary Examiner* — Faisal M Zaman
(74) *Attorney, Agent, or Firm* — InventIQ Legal LLP; Steven J. Cahill

(57) ABSTRACT

A circuit system includes a platform baseboard, an integrated circuit coupled to the platform baseboard, and an auxiliary control board mounted on the platform baseboard. The auxiliary control board includes an interface device that is in communication with the integrated circuit through the platform baseboard. The auxiliary control board can perform power sequencing functions for the circuit system. The auxiliary control board can also perform telemetry gathering, hardware security functions, and configuration of the integrated circuit.

20 Claims, 4 Drawing Sheets

(56) References Cited

U.S. PATENT DOCUMENTS

| | | | | |
|---|---|---|---|---|
| 2006/0155982 | A1* | 7/2006 | Christensen | H04L 49/254 713/153 |
| 2007/0061634 | A1* | 3/2007 | Marisetty | G06F 11/0793 714/48 |
| 2013/0049801 | A1* | 2/2013 | Sun | G06F 30/34 326/38 |
| 2014/0089553 | A1* | 3/2014 | Ma | G06F 13/4221 710/314 |
| 2015/0212559 | A1* | 7/2015 | Ono | G06F 13/24 713/1 |
| 2016/0274816 | A1* | 9/2016 | Zhu | G06F 9/44505 |
| 2016/0275037 | A1* | 9/2016 | Dube | G06F 13/1673 |
| 2017/0206176 | A1* | 7/2017 | Rahman | H01L 25/18 |
| 2018/0139110 | A1* | 5/2018 | Johnson | H04L 41/5096 |
| 2019/0042516 | A1* | 2/2019 | Browning | G06F 1/206 |
| 2019/0213029 | A1* | 7/2019 | Liu | G06F 9/45558 |
| 2021/0043126 | A1* | 2/2021 | Kim | G06F 3/02 |
| 2021/0173669 | A1* | 6/2021 | Zhang | G06F 15/7871 |
| 2022/0027474 | A1* | 1/2022 | Street | G06F 9/542 |
| 2022/0066690 | A1* | 3/2022 | Liu | G06F 3/0604 |
| 2022/0269639 | A1* | 8/2022 | Ganor | G06F 13/4221 |
| 2023/0098532 | A1* | 3/2023 | Lai | G06F 3/02 345/156 |
| 2023/0116296 | A1* | 4/2023 | Schneider | G06F 11/2236 726/25 |
| 2023/0176873 | A1* | 6/2023 | Wu | G06F 1/00 713/1 |

OTHER PUBLICATIONS

European Patent Office, "Extended European Search Report," European patent application No. 23207653.9, Apr. 10, 2024, pp. 1-8.

* cited by examiner

SYSTEMS AND METHODS WITH AUXILIARY CONTROL BOARDS HAVING INTERFACE DEVICES

STATEMENT OF GOVERNMENT INTEREST

This invention was made with Government support under Agreement No. HR00111830002 awarded by the United States Department of Defense. The Government has certain rights in the invention.

TECHNICAL FIELD

This disclosure relates to electronic circuit systems, and more particularly to, circuit systems and methods having auxiliary control boards with interface devices.

BACKGROUND ART

Configurable integrated circuits can be configured by users to implement desired custom logic functions. In a typical scenario, a logic designer uses computer-aided design (CAD) tools to design a custom circuit design. When the design process is complete, the computer-aided design tools generate configuration data. The configuration data is then loaded into configuration memory elements that configure configurable logic circuits in the integrated circuit to perform the functions of the custom circuit design. Configurable logic integrated circuits can be used for co-processing in big-data or fast-data applications. For example, configurable logic integrated circuits may be used in application acceleration tasks in a datacenter and may be reprogrammed during datacenter operation to perform different tasks.

DETAILED DESCRIPTION

Figure 1:
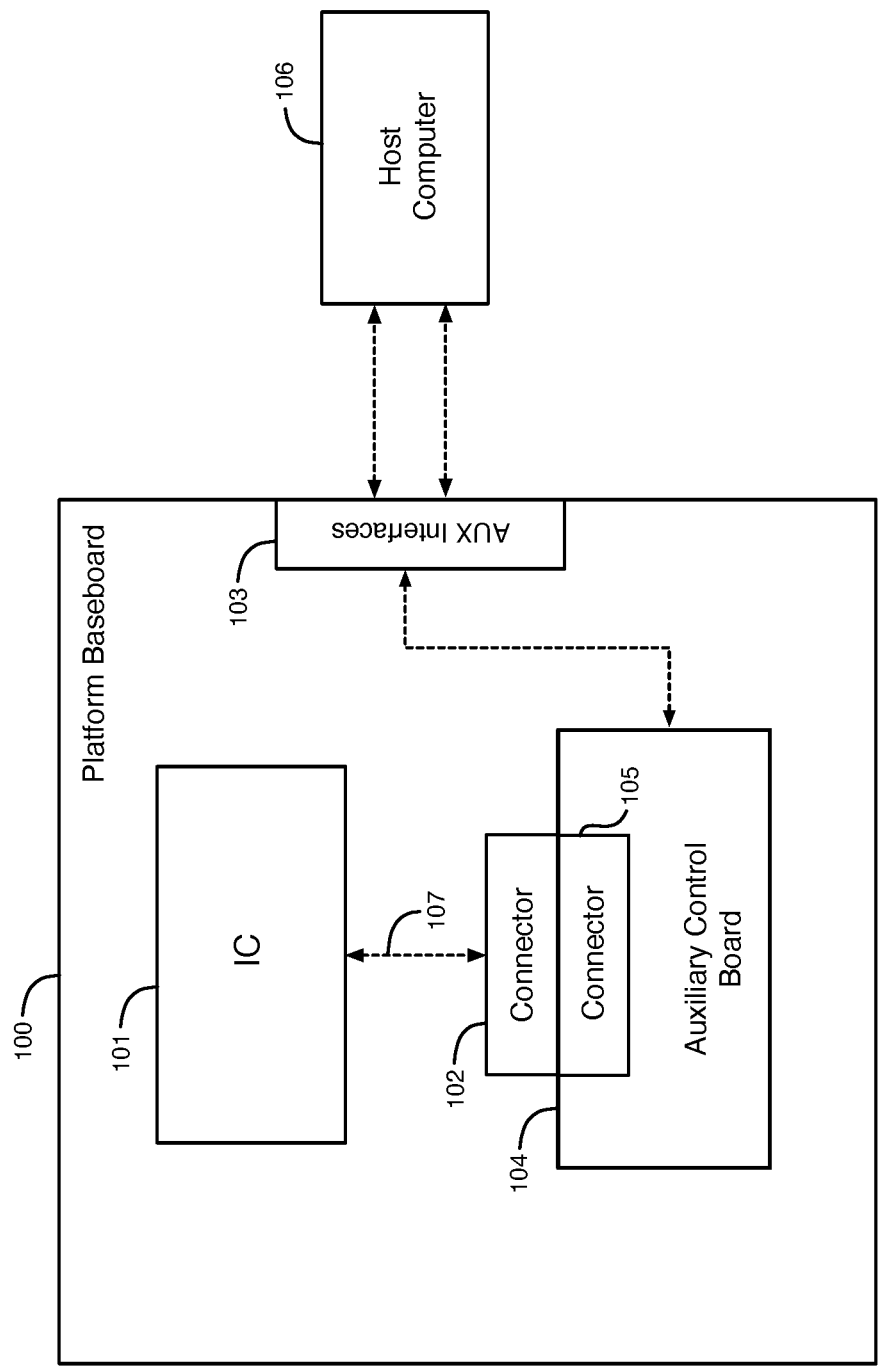
FIG. 1 is a diagram that illustrates a top down view of an example of a circuit system that includes a platform baseboard and an auxiliary control board.

The configuration of configurable integrated circuits is typically performed in one of two configuration modes. The first configuration mode commonly used to configure a configurable integrated circuit is performed through a dedicated configuration interface. The first configuration mode can be performed passively or actively using an external controller or the configurable integrated circuit that controls the configuration, respectively. This first configuration mode is more commonly used in deployment and production systems, because configuration is self-contained. The hardware platform requires dedicated components to support both active and passive configuration.

The disadvantage of performing configuration using the first configuration mode is the required hardware necessary for an implementation of the first configuration mode. The resulting impacts of using the first configuration mode include increased complexity, added engineering effort for hardware verification/debugging/bring-up, sensitivity to component supply chains, consumption of circuit board area, etc. The first configuration mode cannot easily be scaled or reused for different designs. Even if an implementation of the first configuration mode can be mimicked per hardware platform, there still can be differences in the physical realization contributed from the circuit board design (e.g., layout, stack-up, power supply injected noise, etc.).

The second configuration mode is mostly used for prototyping and debugging using the Joint Test Action Group (JTAG) IEEE Standard 1149.1 interface. In the second configuration mode, a host computer initiates configuration, and data is sent to the configurable integrated circuit through an external download cable. Data can also be captured in the configurable integrated circuit and sent through a JTAG port back to the host computer for debugging purposes.

Disadvantages of using the second configuration mode include having to use a specialized external download cable to access the JTAG ports and download performance. The availably or access to this cable assembly might not be readily available in a mass deployment. There is also a bandwidth limitation between the JTAG ports of the configurable integrated circuit and the download cable. JTAG is inherently slow, because the ingress and egress data paths are clocked by the same clock signal, and because of signal integrity issues imposed through the transmission channel.

According to some examples disclosed herein, systems and methods are provided for controlling functions of a circuit system using an auxiliary control board connected to a platform baseboard. An integrated circuit is coupled to the platform baseboard. These systems and methods include a scalable modular hardware architecture that is optimized for configuration and diagnostics of the integrated circuit. On the auxiliary control board, circuits are segmented into a modular apparatus dedicated to auxiliary controls of the functions of the integrated circuit. These functions can include, as examples, configuration, power sequencing, telemetry gathering, hardware security, general communication, and debugging. The auxiliary control board can be used, for example, to configure the integrated circuit in one of multiple configuration modes, if the integrated circuit is a configurable integrated circuit.

These systems and methods can be used to simplify the process of designing hardware to enable configuration and debug of an integrated circuit. These systems and methods can be used to reduce design complexity, bill of materials procurement, verification, and bring-up efforts for circuits designs for integrated circuits. These systems and methods can help abstract lower-level details otherwise required to implement a custom solution per system.

This disclosure discusses integrated circuit devices, including programmable (configurable) integrated circuits, such as field programmable gate arrays (FPGAs). As discussed herein, an integrated circuit (IC) can include hard logic and/or soft logic. As used herein, "hard logic" generally refers to circuits in an integrated circuit device that are not programmable by an end user. The circuits in an integrated circuit device (e.g., in a programmable IC) that are programmable by the end user are referred to as "soft logic."

One or more specific examples are described below. In an effort to provide a concise description of these examples, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

FIG. 1 is a diagram that illustrates a top down view of an example of a circuit system that includes a platform baseboard 100 and an auxiliary control board 104. The platform baseboard 100 is coupled to an integrated circuit (IC) 101, a connector 102, and auxiliary interfaces 103. IC 101 can be any type of IC, such as a configurable IC (e.g., a field programmable gate array or a programmable logic device), a central processing unit (CPU) IC, a graphics processing unit (GPU) IC, an application specific IC (ASIC), a memory IC, etc.

The auxiliary control board 104 is a pluggable module that includes a connector 105. Auxiliary control board 104 can be connected to the platform baseboard 100 by connecting connector 105 to the connector 102 on the platform baseboard 100. The auxiliary control board 104 includes circuits that can communicate with the IC 101 through connectors 102 and 105 and conductors 107 on the platform baseboard 100. The auxiliary control board 104 can also communicate with a host computer 106 through auxiliary interfaces 103 that reside on the platform baseboard 100 and other conductors on platform baseboard 100.

Because configuration hardware architectures for configurable integrated circuits (ICs) across platforms are relatively consistent, the auxiliary control board 104 can be created as a modular design. As result, the auxiliary control board 104 can be scaled across multiple different platforms. If IC 101 is a configurable IC, the auxiliary control board 104 includes circuitry that can perform the logical functionality for the first and second configuration modes for configuring IC 101 that are described above and additional functions. Thus, the logical functionality for the first and second configuration modes and additional functions are integrated into the auxiliary control board 104.

Figure 2:
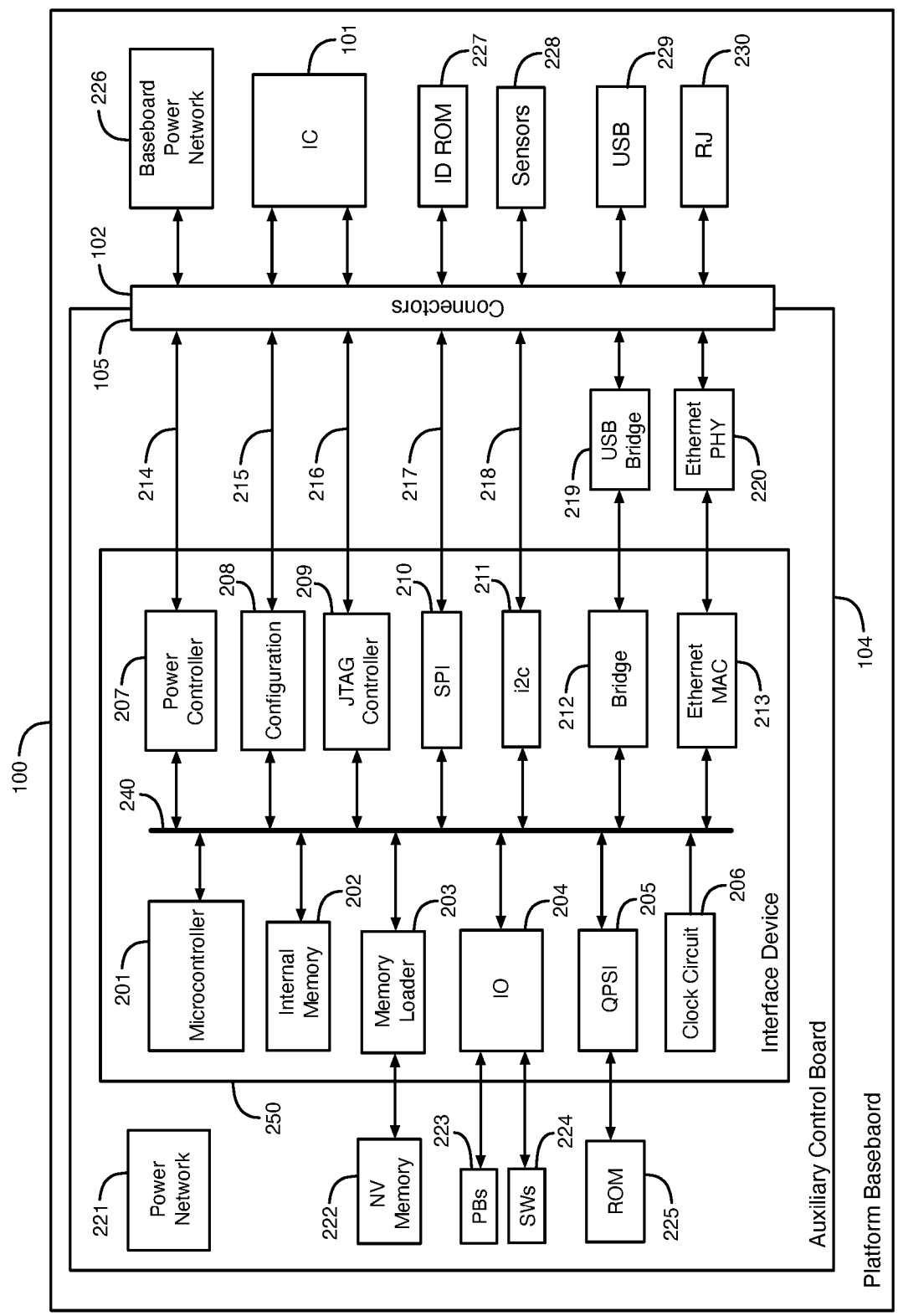
FIG. 2 is a diagram that illustrates a top down view of a detailed example of the circuit system of FIG. 1.

FIG. 2 is a diagram that illustrates a top down view of a detailed example of the circuit system of FIG. 1. In the example shown in Figure (FIG. 2, the auxiliary control board 104 is coupled to a power network 221, non-volatile (NV) memory 222, push buttons (PBs) 223, switches (SWs) 224, random access memory (ROM) 225, an interface device 250, busses 214-218, universal serial bus (USB) bridge 219, Ethernet physical (PHY) layer circuitry 220, and connector 105. The interface device 250 includes microcontroller circuit 201, internal memory 202, memory loader 203, input/output (IO) interface 204, queued serial peripheral interface (QPSI) 205, clock circuit 206, power controller circuit 207, configuration controller circuit 208, JTAG controller circuit 209, serial peripheral interface (SPI) circuit 210, inter-integrated circuit (i2c) protocol communication circuit 211, bridge 212, Ethernet medium access control (MAC) circuit 213, and internal bus 240. The interface device 250 can be an integrated circuit, for example, a configurable IC, such as a programmable logic device or a field programmable gate array (FPGA). If interface device 250 is a configurable IC, then the circuit blocks 201-213 can be implemented by configuring programmable logic (i.e., soft logic) circuits in a core region of the IC and/or as non-programmable (hard logic) circuits.

Also, in the example of FIG. 2, the platform baseboard 100 includes baseboard power network 226, the IC 101 of FIG. 1, identification (ID) ROM 227, sensors 228, universal serial bus (USB) interface 229, register jack (e.g., RJ-45) network interface 230, and connector 102. Auxiliary control board 104 is mounted on platform baseboard 100 and coupled to platform baseboard 100 through connectors 102 and 105.

In previously known systems that configure configurable ICs, system designers need to understand the requirements presented in datasheets, user guides, and application notes before designing the micro-architecture for the configuration. This process can be error prone, because hardware, firmware, and software are needed to implement the configuration of the configurable IC. The system of FIG. 2 provides a solution that can scale across multiple platforms and that reduces design complexity by using a connector and mapping the configuration signals to the configurable IC accordingly.

The system of FIG. 2 also enables scalability for configuration control logic, firmware, and/or software. Leveraging design reuse allows proven hardware, firmware, and software solutions to be carried over to additional platforms. Providing a scalable system drastically reduces the time taken for verification, debug, and system bring-up, because the hardware, firmware, and software solutions have already been vetted. The system of FIG. 2 provides a plug and play approach that is applicable to configuration platform designs for configurable ICs.

The modular auxiliary control board 104 also frees up circuit board area in the platform baseboard 100. The platform baseboard 100 is provisioned for the connector 105 of the auxiliary control board 104. The auxiliary control board 104 can be mounted vertically on, or in parallel to, the platform baseboard 100. Because the components of the auxiliary control board 104 do not reside on the platform baseboard 100, area is freed up on the platform baseboard 100 for other components.

Increased JTAG performance can be achieved by integrating the functionality of the JTAG download cable into the auxiliary control board 104. Driving the JTAG signals from the auxiliary control board 104, instead of from a download cable, reduces the inductance caused by the cable assembly to the header connection mounted on the platform baseboard 100. This configuration improves signal integrity, which increases signal margins allowing higher channel performance. Additionally, integrating the functionality of the JTAG download cable into the auxiliary control board 104 removes the requirement to connect a specialized download cable to the system. Instead, a standard USB cable can be used with the system of FIG. 2, as described below, which simplifies debugging/prototyping through the JTAG ports.

Obtaining a surplus of the modular auxiliary control boards 104 can reduce uncertainty regarding material procurement for manufacturing the circuit system of FIGS. 1 and 2. Components such as complex programmable logic devices (CPLDs), Flash memories, power regulators, etc. can be difficult to source. The system of FIGS. 1 and 2 can relieve some procurement burden, because an inventory of the auxiliary control boards 104 can be built up in advance of system design, so that one less component needs to be procured during the design cycle.

The circuit system of FIG. 2 reduces design complexity by employing a modular design approach. The implementation and functionality of the microcontroller circuit 201 is abstracted from end users. If IC 101 is a configurable IC, the microcontroller circuit 201 can perform all of the signaling/protocol detail required for configuration of IC 101 using an external non-volatile memory (as with the first configuration mode), as described below.

The following description is based on an implementation in which IC 101 is a configurable IC. Prior to configuration of IC 101, configuration data is transferred from the host computer 106 to non-volatile memory 222 (e.g., a Flash memory) through either USB interface 229 or RJ interface 230 in the first configuration mode. If the USB interface 229 is used, the configuration data is transmitted through a USB cable, USB interface 229, connectors 102/105, USB bridge 219, bus bridge 212, on-chip bus 240, and memory loader 203 to NV memory 222. The configuration data is then stored in the external non-volatile (NV) memory 222. If the RJ interface 230 is used, the configuration data is transmitted through an RJ cable, RJ interface 230, connectors 102/105, Ethernet PHY layer circuitry 220, Ethernet MAC circuit 213, on-chip bus 240, and memory loader 203 to NV memory 222. The configuration data is then stored in the NV memory 222. The transfer of the configuration data from the host computer 106 to NV memory 222 can, for example, be performed under the control of the microcontroller circuit 201. The transfer of data through bus 240 can, for example, be controlled using clock signals generated by clock circuit 206.

Subsequent to storing the configuration data in NV memory 222, the IC 101 is configured with the configuration data retrieved from NV memory 222. The microcontroller 201 retrieves the configuration data from the NV memory 222 and then starts streaming the configuration data to the configuration circuit 208 through the memory loader 203 and the bus 240. The configuration circuit 208 then configures the IC 101 by transmitting the configuration data to IC 101 through bus 215 (e.g., following a standard streaming protocol such as the Avalon® streaming protocol) and connectors 105/102. After all the configuration data has been transmitted to the IC 101, the microcontroller 201 checks the configuration done signals from the IC 101 before signifying that the configuration process has completed successfully.

The microcontroller circuit 201 can also perform all of the signaling/protocol detail required for configuration of IC 101 using the JTAG interface (in the second configuration mode), as is now described. In the circuit system of FIG. 2, the functionality of the JTAG download cable is integrated into the auxiliary control board 104. Thus, the auxiliary control board 104 includes circuit blocks that implement the functions of the JTAG download cable. As a result, the requirement for using a specialized active JTAG download cable is eliminated.

Initially, during the second configuration mode, configuration data is transmitted through a USB cable, the USB interface 229, and through connectors 102/105 onto the auxiliary control board 104. The USB bridge 219 receives the configuration data from the USB interface 229 as a USB signal and converts the configuration data into a streaming first-in-first-out (FIFO) interface that is transmitted to bridge 212. The bridge 212 (e.g., a FIFO to Avalon® Streaming bridge) then routes the configuration data through the bus 240 (e.g., an Avalon® bus) to JTAG controller circuit 209 (e.g., an Avalon® to JTAG controller). JTAG controller circuit 209 then transmits the configuration data as dedicated JTAG signals to the IC 101 through bus 216 and connectors 102/105 for configuration or debugging.

The debugging functions can be performed when communication between the host computer 106 and IC 101 is established. The auxiliary control board 104 can run any suitable debugging software tools that use the JTAG interface of a configurable IC. One or more debugging software tools can be run by the JTAG configuration controller 209 for performing debugging functions of the IC 101 using the configuration data and the JTAG interface. A debugging software tool run on configuration controller 209 can, for example, send JTAG signals to IC 101 for performing tests and can receive signals indicative of results of the tests back from the IC 101 for analysis and debugging (e.g., via bus 216 and connectors 102/105).

The auxiliary control board 104 can also perform additional functions, such as, power sequencing, telemetry gathering, hardware security, and general communication. To perform power sequencing on the platform baseboard 100, the power controller circuit 207 in the interface device 250 can communicate with and control the baseboard power network 226 on the platform baseboard 100 through power management bus 214 (e.g., to control power supply voltage sequencing on platform baseboard 100). The power controller circuit 207 can manage power of the circuits 201-213 in the interface device 250 by transmitting power control signals to circuits 201-213 through bus 240. The circuits 219-220 and 222-225 and interface device 250 on the auxiliary control board 104 receive power through power network 221.

To perform telemetry gathering, the interface device 250 can receive telemetry measurements (e.g., of power, current, voltage, and/or temperature on platform baseboard 100) or other data from remote points, for example, from sensors 228 through bus 218 and i2C interface 211, through bus 217 and SPI interface 210, or through power management bus 214 and power controller 207. The telemetry measurements or other data can be stored, for example, in internal memory 202 or in NV memory 222, displayed in a user interface, and/or processed by microcontroller circuit 201.

The interface device 250 can also perform hardware security functions, such as authentication, data encryption, and data decryption. The interface device 250 can perform the hardware security functions, for example, using identifiers (ID), keys, or other security data stored in ROM 227 and received through bus 217 and SPI interface 210 or stored in ROM 225 and received through QSPI interface 205. The hardware security functions can, for example, be performed by the microcontroller circuit 201. The interface device 250 can also perform general communication with interfaces, such as push buttons (PBs) 223 and/or switches (SWs) 224, through IO interface 204.

Figure 3:
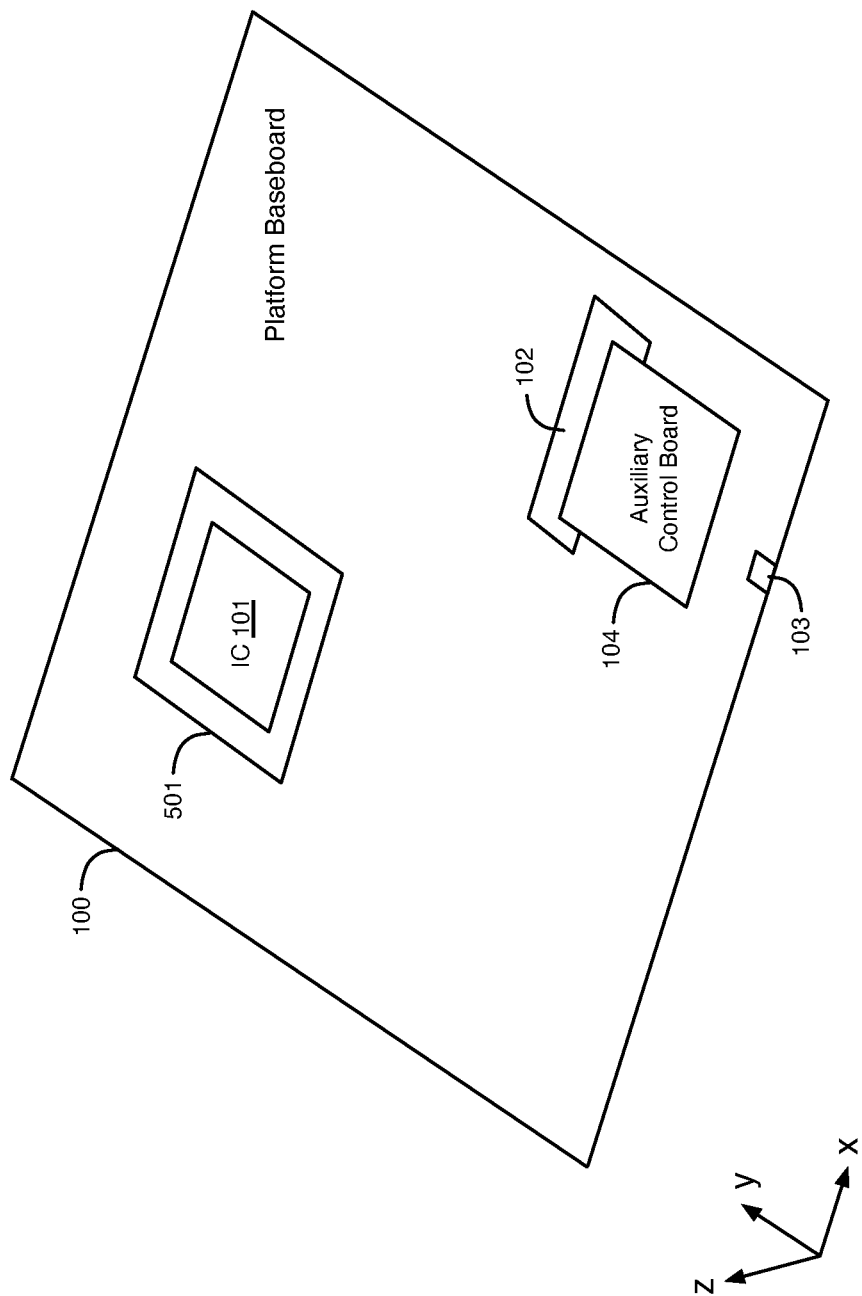
FIG. 3 is a diagram that illustrates another example of the circuit system of FIGS. 1-2.

FIG. 3 is a diagram that illustrates another example of the circuit system of FIGS. 1-2. In the example of FIG. 3, the platform baseboard 100 is shown in an angular top down view, as shown by the x-y-z axes. The auxiliary control board 104 is mounted on the baseboard 100 and coupled to connector 102, as shown in FIG. 3. The IC 101 is housed in an IC package 501 that is mounted on and coupled to the platform baseboard 100. Auxiliary control board 104 is in communication with a host computer through auxiliary interface 103.

Figure 4:
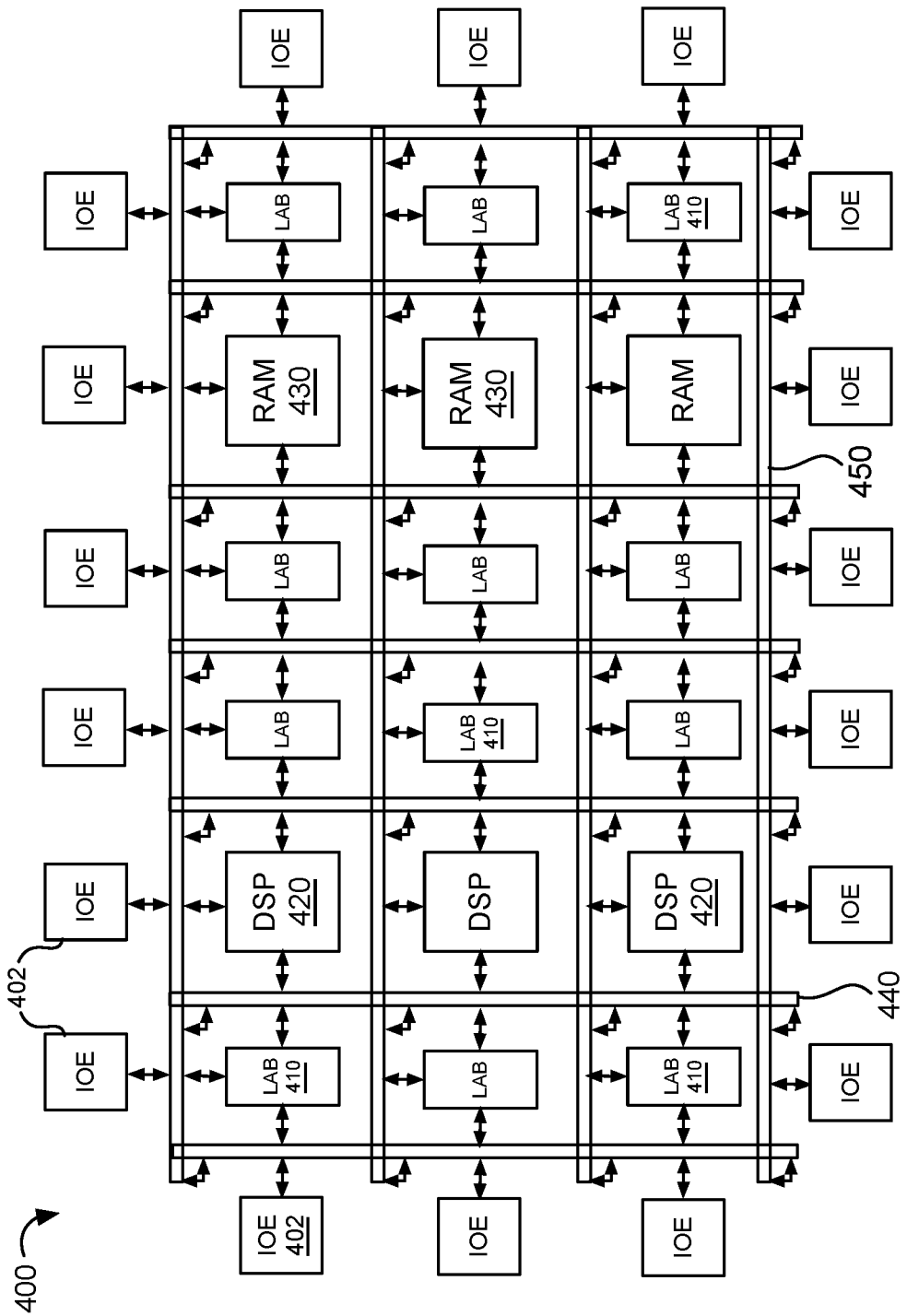
FIG. 4 is a diagram of an illustrative example of a configurable integrated circuit (IC).

FIG. 4 is a diagram of an illustrative example of a configurable integrated circuit (IC) 400. Configurable IC 400 is an example of IC 101 of FIGS. 1-3 and/or interface device 250. As shown in FIG. 4, the configurable integrated circuit 400 may include a two-dimensional array of functional blocks, including logic array blocks (LABs) 410 and other functional blocks, such as random access memory (RAM) blocks 430 and digital signal processing (DSP) blocks 420, for example. Functional blocks, such as LABs 410, may include smaller programmable regions (e.g., logic elements, configurable logic blocks, or adaptive logic modules) that receive input signals and perform custom functions on the input signals to produce output signals.

In addition, the configurable integrated circuit 400 may have input/output elements (IOEs) 402 for driving signals off of configurable integrated circuit 400 and for receiving signals from other devices. Input/output elements 402 may include parallel input/output circuitry, serial data transceiver circuitry, differential receiver and transmitter circuitry, or other circuitry used to connect one integrated circuit to another integrated circuit. As shown, input/output elements 402 may be located around the periphery of the IC. If desired, the configurable integrated circuit 400 may have input/output elements 402 arranged in different ways. For example, input/output elements 402 may form one or more columns of input/output elements that may be located anywhere on the configurable integrated circuit 400 (e.g., distributed evenly across the width of the configurable integrated circuit). If desired, input/output elements 402 may form one or more rows of input/output elements (e.g., distributed across the height of the configurable integrated circuit). Alternatively, input/output elements 402 may form islands of input/output elements that may be distributed over the surface of the configurable integrated circuit 400 or clustered in selected areas.

The configurable integrated circuit 400 may also include programmable interconnect circuitry in the form of vertical routing channels 440 (i.e., interconnects formed along a vertical axis of configurable integrated circuit 400) and horizontal routing channels 450 (i.e., interconnects formed along a horizontal axis of configurable integrated circuit 400), each routing channel including at least one track to route at least one wire.

Note that other routing topologies, besides the topology of the interconnect circuitry depicted in FIG. 4, may be used. For example, the routing topology may include wires that travel diagonally or that travel horizontally and vertically along different parts of their extent as well as wires that are perpendicular to the device plane in the case of three dimensional integrated circuits, and the driver of a wire may be located at a different point than one end of a wire. The routing topology may include global wires that span substantially all of configurable integrated circuit 400, fractional global wires such as wires that span part of configurable integrated circuit 400, staggered wires of a particular length, smaller local wires, or any other suitable interconnection resource arrangement.

Furthermore, it should be understood that examples disclosed herein may be implemented in any type of integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Configurable integrated circuit 400 may contain programmable memory elements. Memory elements may be loaded with configuration data (also called programming data) using input/output elements (IOEs) 402. Once loaded, the memory elements each provide a corresponding static control signal that controls the operation of an associated functional block (e.g., LABs 410, DSP 420, RAM 430, or input/output elements 402).

In a typical scenario, the outputs of the loaded memory elements are applied to the gates of field-effect transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory or programmable memory elements.

The programmable memory elements may be organized in a configuration memory array consisting of rows and columns. A data register that spans across all columns and an address register that spans across all rows may receive configuration data. The configuration data may be shifted onto the data register. When the appropriate address register is asserted, the data register writes the configuration data to the configuration memory elements of the row that was designated by the address register.

Configurable integrated circuit 400 may include configuration memory that is organized in sectors, whereby a sector may include the configuration RAM bits that specify the function and/or interconnections of the subcomponents and wires in or crossing that sector. Each sector may include separate data and address registers.

The programmable IC of FIG. 4 is merely one example of an IC that can be used with embodiments disclosed herein. The embodiments disclosed herein can be used with any suitable integrated circuit or system. For example, the embodiments disclosed herein can be used with numerous types of devices such as processor integrated circuits, central processing units, memory integrated circuits, graphics processing unit integrated circuits, application specific standard products (ASSPs), application specific integrated circuits (ASICs), and configurable logic integrated circuits. Examples of configurable logic integrated circuits include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The integrated circuits disclosed in one or more embodiments herein can be part of a data processing system that includes one or more of the following components: a processor; memory; input/output circuitry; and peripheral devices. The data processing system can be used in a wide variety of applications, such as computer networking, data networking, instrumentation, video processing, digital signal processing, or any suitable other application. The integrated circuits can be used to perform a variety of different logic functions.

In general, software and data for performing any of the functions disclosed herein may be stored in non-transitory computer readable storage media. Non-transitory computer readable storage media is tangible computer readable storage media that stores data for access at a later time, as opposed to media that only transmits propagating electrical signals (e.g., wires). The software code may sometimes be referred to as software, data, program instructions, instructions, or code. The non-transitory computer readable storage media may, for example, include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Additional examples are now described. Example 1 is an auxiliary control board comprising: a connector configured to electrically couple the auxiliary control board to a platform baseboard; and an interface device, wherein the interface device is configurable to perform power sequencing functions and to communicate with an integrated circuit through the connector and conductors in the platform baseboard, wherein the integrated circuit is coupled to the platform baseboard.

In Example 2, the auxiliary control board of Example 1 may optionally include, wherein the integrated circuit is a field programmable gate array, and wherein the auxiliary control board performs configuration of the field programmable gate array using non-volatile memory mounted on the auxiliary control board.

In Example 3, the auxiliary control board of any one of Examples 1-2 may optionally include, wherein the interface device comprises a configurable integrated circuit.

In Example 4, the auxiliary control board of any one of Examples 1-3 may optionally include, wherein the configuration of the field programmable gate array is supported in a first mode that uses a dedicated configuration interface and in a second mode that uses a Joint Test Action Group interface.

In Example 5, the auxiliary control board of any one of Examples 1-4 may optionally include, wherein the auxiliary control board supports telemetry measurement gathering.

In Example 6, the auxiliary control board of any one of Examples 1-5 may optionally include, wherein the auxiliary control board supports security functions.

In Example 7, the auxiliary control board of any one of Examples 1-6 further comprises: a first data conversion circuit that is coupled to provide data received through the connector to the interface device, wherein the interface device comprises a second data conversion circuit that is coupled to receive the data from the first data conversion circuit and to provide the data to an internal bus in the interface device.

In Example 8, the auxiliary control board of any one of Examples 1-7 may optionally include, wherein the interface device is coupled to receive telemetry measurements from the platform baseboard through the connector and a bus on the auxiliary control board.

In Example 9, the auxiliary control board of any one of Examples 1-8 may optionally include, wherein the interface device is configurable to perform hardware security functions for the integrated circuit.

Example 10 is a circuit system comprising: a platform baseboard; an integrated circuit coupled to the platform baseboard; and an auxiliary control board mounted on the platform baseboard, wherein the auxiliary control board comprises an interface device that performs power sequencing functions for the circuit system, and wherein the interface device is in communication with the integrated circuit through the platform baseboard.

In Example 11, the circuit system of Example 10 further comprises: an auxiliary interface coupled to the auxiliary control board, wherein the interface device is coupled to be in communication with a host computer through the auxiliary interface.

In Example 12, the circuit system of any one of Examples 10-11 may optionally include, wherein the integrated circuit is a configurable integrated circuit, and wherein the interface device is configurable to perform configuration for the configurable integrated circuit.

In Example 13, the circuit system of any one of Examples 10-12 may optionally include, wherein the interface device is configurable to perform hardware security functions for the circuit system.

In Example 14, the circuit system of any one of Examples 10-13 may optionally include, wherein the integrated circuit is a configurable integrated circuit, and wherein the interface device is configurable to provide configuration data to the configurable integrated circuit.

In Example 15, the circuit system of any one of Examples 10-14 may optionally include, wherein the interface device is configurable to receive telemetry measurements from components coupled to the platform baseboard.

In Example 16, the circuit system of any one of Examples 10-15 may optionally include, wherein the interface device is configurable to perform debugging functions for the integrated circuit.

Example 17 is a method comprising: coupling an auxiliary control board through a connector to a platform baseboard so that an interface device on the auxiliary control board is in communication with an integrated circuit that is coupled to the platform baseboard; and configuring the interface device to perform power sequencing functions for a circuit system that comprises the platform baseboard, the integrated circuit, and the auxiliary control board.

In Example 18, the method of Example 17, wherein the integrated circuit is a configurable integrated circuit, and wherein the method further comprises configuring the interface device to implement a configuration controller circuit that provides configuration data to the configurable integrated circuit for configuring the configurable integrated circuit.

In Example 19, the method of any one of Examples 17-18 further comprises: configuring the interface device to implement telemetry gathering for the circuit system.

In Example 20, the method of any one of Examples 17-19 further comprises: configuring the interface device to implement a microcontroller circuit that performs hardware security functions for the integrated circuit.

The foregoing description of the examples has been presented for the purpose of illustration. The foregoing description is not intended to be exhaustive or to be limiting to the examples disclosed herein. In some instances, features of the examples can be employed without a corresponding use of other features as set forth. Many modifications, substitutions, and variations are possible in light of the above teachings.

The invention claimed is:

1. An auxiliary control board comprising:
a connector configured to electrically couple the auxiliary control board to a platform baseboard;
an interface device that is a first integrated circuit comprising a controller circuit, a memory loader, a microcontroller circuit, and a configuration circuit, wherein the interface device is configurable to communicate with a configurable integrated circuit through the connector and conductors in the platform baseboard, wherein the configurable integrated circuit is coupled to the platform baseboard; and
a bridge circuit, wherein the microcontroller circuit streams first configuration data through the memory loader to the configuration circuit, wherein the configuration circuit transmits the first configuration data received from the memory loader to the configurable integrated circuit to configure the configurable integrated circuit in a first configuration mode, and wherein the controller circuit transmits second configuration data received through the bridge circuit to the configurable integrated circuit for configuring the configurable integrated circuit in a second configuration mode.

2. The auxiliary control board of claim 1, wherein the configurable integrated circuit is a field programmable gate array, and wherein the auxiliary control board performs configuration of the field programmable gate array using non-volatile memory mounted on the auxiliary control board in the first configuration mode.

3. The auxiliary control board of claim 2, wherein the first integrated circuit is an additional configurable integrated circuit.

4. The auxiliary control board of claim 1, wherein the controller circuit is a Joint Test Action Group controller circuit that transmits the second configuration data as dedicated Joint Test Action Group signals to the configurable integrated circuit.

5. The auxiliary control board of claim 4, wherein the auxiliary control board supports telemetry measurement gathering and security functions.

6. The auxiliary control board of claim 1, wherein the auxiliary control board supports telemetry measurement gathering and security functions.

7. The auxiliary control board of claim 1, wherein the interface device is configurable to perform power sequencing functions on the platform baseboard.

8. The auxiliary control board of claim 1, wherein the interface device is coupled to receive telemetry measurements from the platform baseboard through the connector and a bus on the auxiliary control board.

9. The auxiliary control board of claim 1, wherein the interface device is configurable to perform debugging functions for the configurable integrated circuit.

10. A circuit system comprising:
a platform baseboard;
a configurable integrated circuit coupled to the platform baseboard; and
an auxiliary control board mounted on the platform baseboard, wherein the auxiliary control board comprises a connector configured to electrically couple the auxiliary control board to the platform baseboard, wherein the auxiliary control board further comprises an interface device that is in communication with the configurable integrated circuit through the connector and through the platform baseboard, wherein the interface device is a second integrated circuit that comprises a bridge circuit, a controller circuit, a microcontroller circuit, and a configuration circuit,
wherein the microcontroller circuit streams first configuration data to the configuration circuit, wherein the configuration circuit transmits the first configuration data to the configurable integrated circuit in a first configuration mode to configure the configurable integrated circuit, wherein the bridge circuit routes second configuration data to the controller circuit, and wherein the controller circuit transmits the second configuration data to the configurable integrated circuit in a second configuration mode for configuration of the configurable integrated circuit.

11. The circuit system of claim 10 further comprising: an auxiliary interface coupled to the auxiliary control board, wherein the interface device is coupled to be in communication with a host computer through the auxiliary interface.

12. The circuit system of claim 10, wherein the interface device is a field programmable gate array configurable to perform configuration for the configurable integrated circuit.

13. The circuit system of claim 10, wherein the interface device is configurable to perform hardware security functions for the circuit system.

14. The circuit system of claim 10, wherein the controller circuit is a Joint Test Action Group controller circuit that transmits the second configuration data as dedicated Joint Test Action Group signals to the configurable integrated circuit.

15. The circuit system of claim 10, wherein the interface device is configurable to receive telemetry measurements from components coupled to the platform baseboard.

16. The circuit system of claim 10, wherein the interface device is configurable to perform debugging functions for the configurable integrated circuit.

17. A method comprising:
coupling an auxiliary control board through a connector to a platform baseboard so that an interface device on the auxiliary control board is in communication with a configurable integrated circuit that is coupled to the platform baseboard;
configuring the interface device to communicate with the configurable integrated circuit, wherein a circuit system comprises the platform baseboard, the configurable integrated circuit, and the auxiliary control board, and wherein the interface device is a second integrated circuit that comprises a bridge circuit, a controller circuit, a microcontroller circuit, and a configuration circuit;
streaming first configuration data to the configuration circuit using the microcontroller circuit;
transmitting the first configuration data to the configurable integrated circuit in a first configuration mode using the configuration circuit to configure the configurable integrated circuit;
routing second configuration data to the controller circuit through the bridge circuit; and
transmitting the second configuration data to the configurable integrated circuit in a second configuration mode using the controller circuit for configuration of the configurable integrated circuit.

18. The method of claim 17 further comprising: configuring the interface device to implement the configuration circuit.

19. The method of claim 17 further comprising: configuring the interface device to implement telemetry gathering for the circuit system.

20. The method of claim 17 further comprising: configuring the interface device to implement the microcontroller circuit to perform hardware security functions for the configurable integrated circuit.

* * * * *